US 8,235,864 B2

(12) United States Patent
Eriksson et al.

(10) Patent No.: US 8,235,864 B2
(45) Date of Patent: Aug. 7, 2012

(54) METHOD FOR OPERATING AN AUTOMATIC OR SEMI-AUTOMATIC MANUAL TRANSMISSION OF A HEAVY VEHICLE WHEN IN IDLE-DRIVING MODE

(75) Inventors: Anders Eriksson, Torslanda (SE); Sixten Berglund, Torslanda (SE)

(73) Assignee: Volvo Lastvagnar AB, Göteborg (SE)

( * ) Notice: Subject to any disclaimer, the term of this patent is extended or adjusted under 35 U.S.C. 154(b) by 1188 days.

(21) Appl. No.: 12/065,020

(22) PCT Filed: Sep. 6, 2006

(86) PCT No.: PCT/SE2006/001022
§ 371 (c)(1),
(2), (4) Date: Feb. 27, 2008

(87) PCT Pub. No.: WO2007/030065
PCT Pub. Date: Mar. 15, 2007

(65) Prior Publication Data
US 2008/0248920 A1  Oct. 9, 2008

Related U.S. Application Data

(60) Provisional application No. 60/596,186, filed on Sep. 7, 2005.

(51) Int. Cl.
*B60W 10/06* (2006.01)
*B60W 10/10* (2006.01)
*B60W 10/18* (2006.01)
(52) U.S. Cl. .......................................... 477/94; 477/121
(58) Field of Classification Search ................. 477/94, 477/121
See application file for complete search history.

(56) References Cited

U.S. PATENT DOCUMENTS

| 3,895,542 A * | 7/1975 | Miyauchi ................. 477/158 |
| 4,473,882 A * | 9/1984 | Suzuki et al. ............... 701/54 |
| 5,203,235 A * | 4/1993 | Iizuka ........................ 477/94 |
| 5,662,548 A | 9/1997 | Mori |
| 5,989,153 A | 11/1999 | Fischer et al. |
| 2001/0049576 A1 | 12/2001 | Wheeler et al. |

FOREIGN PATENT DOCUMENTS
WO  0242108 A1  5/2002

OTHER PUBLICATIONS
International Search Report for corresponding International Application PCT/SE2006/001022.
* cited by examiner

*Primary Examiner* — Sherry Estremsky
(74) *Attorney, Agent, or Firm* — WRB-IP LLP

(57) ABSTRACT

A method for operating a semi-automatic or automatic manual transmission of a heavy truck when driving at idle speed. The method includes supplying fuel to the engine of the heavy truck at a rate that facilitates engine-idle operation. In another step, the method engages the automatic or semi-automatic transmission in a gear higher than the starting gear of the transmission and permits the truck to operate at a first substantially uniform driving velocity under engine-idle power. Depending upon traffic and environmental requirements which require a slower or higher speed, the driver downshifts or upshifts the semi-automatic or automatic transmission by depressing a control pedal of the truck and then drives the truck at a second substantially uniform driving velocity under engine-idle power. For a downshift, the second substantially uniform driving velocity is less than the first substantially uniform driving velocity. For an upshift, the second substantially uniform driving velocity is greater than the first substantially uniform driving velocity.

19 Claims, 3 Drawing Sheets

METHOD FOR OPERATING AN AUTOMATIC OR SEMI-AUTOMATIC MANUAL TRANSMISSION OF A HEAVY VEHICLE WHEN IN IDLE-DRIVING MODE

CROSS-REFERENCE TO RELATED APPLICATIONS

The present application claims the benefit of U.S. Provisional Application No. 60/596,186 filed (Sep. 7, 2005). Said application is expressly incorporated herein by reference in its entirety.

The present invention relates to commercial vehicles; and more particularly to drivetrain control strategies for such vehicles as heavy trucks, buses and the like.

In the course of driving heavy vehicles such as overland trucks and buses (which should be considered interchangeable for purposes of the description contained herein), it is common to be required to drive at relatively slow speeds, often for extended periods of time. Exemplary situations are driving in slow, backed up traffic and maneuvering about loading yards where high-speed travel is not possible. In modern heavy vehicles, it is common to find that such vehicles are equipped with a semi-automatic transmission or an automatic mechanical transmission or a power-shifting automatic transmission. In any of the above cases, computer control strategies are utilized in the selection of gear engagements, as well as transition strategies between the different gear choices of the transmission. Furthermore, in a stepped transmission some gearwheels and shafts that are used for torque transfer in different gears are rotationally fixed to each other by means of connecting devices, for instance clutches. In a positive connecting device, such as a dog clutch, the torque is transferred substantially by normal forces, as opposed to a frictional connecting device, such as a plate clutch, where the torque is transferred substantially by friction forces. The difference between the different types of available stepped transmissions can be described as the operation of clutch, gear selection, and carrying out the gear selection. In an automatic mechanical transmission the operation of the clutch, gear selection and the carrying out of the gear selection is performed automatically without driver intervention. A manual transmission requires the driver to perform the operation of the clutch, gear selection and the carrying out of the gear selection. Manual transmissions are typically of the mechanically engaged type in general. A semi-automatic transmission is one in which one or more of the operation of the clutch, gear selection, or carrying out gear selection is performed by the driver of the truck. The semi-automatic transmission may also be of the mechanical type transmission. In a transmission of the mechanically engaged type, there are positive connecting devices. During a gear shift, there will normally be an interruption of the torque transfer in a transmission of the mechanically engaged type. Frictional connecting devices are mainly found in powershifting transmission, where torque is also transferred during a gear shift. Power-shifting transmissions are usually automatic or semi-automatic. Automatic transmissions of the mechanically engaged type are referred to as automatic mechanical "transmissions. Such a transmission may use a manual transmission with controllers to automate the operation of the transmission. It may also be specifically designed to be automatic and not based on a manual transmission. Hereinafter, the automatic mechanical transmission and power-shifting automatic transmission are referred to as an automatic transmission.

Referring to the situations in which it is desired that the heavy vehicle move slowly but substantially constantly on course, operators have developed habits for engaging an appropriate low gear which carries the vehicle forward or backward under the power of the idling engine. Depending upon the desired speed and the heavy vehicle load, among other factors, different low gears are selectable.

The low gears available for selection, however, are limited by the torque that can be developed in each gear by the engine operating at the preset idle speed, and the range of gears available for use at any particular time will be determined by conditions of the vehicle, as well as conditions of the environment within which the vehicle is operating. The two primary conditions upon which the range of available gears is dependent is the mass of the vehicle (including any load) and ground inclination. Dependent at least in part on each of these two characteristics, the highest gear of the transmission can be determined at which the idling engine can maintain a substantially constant speed of the vehicle without losing speed because of insufficient torque capability. Heretofore, operators have been left to draw on their experience for selecting an initial gear for such idle travel, with adjustments being made up or down in order to engage the gear which produces the desired travel speed, and which is also capable of maintaining that speed using the torque developed at the preset idle speed of the engine, for example, 650 revolutions per minute.

It is appreciated that if presently existing conditions are known which bear upon the highest gear selection at which the idling engine can maintain a constant vehicle speed, that gear can be determined, engaged and utilized for powering travel of the vehicle. Often times, however, the highest possible gear ratio carries the vehicle at a groundspeed greater than desired. For instance, the traffic speed within which the heavy truck is operating maybe slower than this speed which the idling engine can maintain under existing conditions. Heretofore, as described above, selection of the proper gear which permits the engine to operate at idle and produce the desired speed of the vehicle was performed by the operator himself based on past experience and trial-and-error with respect to selection within a typical low range of gears.

This type of trial-and-error, hunt-and-peck gear selection by the operator obviously has drawbacks; among others, if the truck is operating under slow speed conditions, the driver can become unnecessarily fatigued by the gear selection process. Still further, operating economy can suffer not only because of inefficiencies associated with constant gear changing and adjustments, but also if the optimal gear is not selected which can use the preset idle speed of the engine for maintaining the desired vehicle speed. Therefore, the need has been recognized for a drivetrain control system in which such gear selections are made on at least a semi-automated basis with only minimal or no direct selection input from the operator.

When in idle-driving mode, retardation of the vehicle through braking, engine-braking or other means of retardation, the transmission would downshift in response to this retardation. Previous transmission control units also used the vehicle speed to cause the transmission to downshift. However, a driver could not demand a particular type of downshift without also demanding vehicle retardation. Therefore, the need has been recognized for a drivetrain control system in which the driver can demand a particular downshift without necessarily causing vehicle retardation.

In at least one embodiment, the present invention takes the form of a method for operating a semi-automatic or automatic transmission of a heavy vehicle when driving at idle speed. The method, as shown in FIG. 1, comprises (includes, but is not necessarily limited to) supplying fuel to the engine of the heavy truck at a rate that facilitates engine-idle operation (block 10). In another step, the method engages the semi-automatic or automatic transmission in a gear higher than the starting gear of the transmission and permits the truck to operate at a first substantially uniform driving velocity under engine-idle power. Depending upon traffic and environmental requirements which require a slower speed, the driver downshifts the semiautomatic or automatic transmission (block 20) by depressing the brake pedal of the truck (block 20) and then drives the truck at a second substantially uniform driving velocity under engine-idle power (block 40). Necessarily, the second substantially uniform driving velocity is less than the first substantially uniform driving velocity. In another embodiment, the present invention takes the form of a method for operating a semi-automatic or automatic transmission of a heavy vehicle when driving at idle speed. The method, as shown in FIG. 2, comprises (includes, but is not necessarily limited to) supplying fuel to the engine of the heavy truck at a rate that facilitates engine-idle operation (block 100). In another step, the method engages the semi-automatic or automatic transmission in a gear higher than the starting gear of the transmission and permits the truck to operate at a first substantially uniform driving velocity under engine-idle power. Depending upon traffic and environmental requirements which require a higher speed, the driver upshifts the semi-automatic or automatic transmission (block 130) by depressing the accelerator pedal of the truck (block 120) and then drives the truck at a second substantially uniform driving velocity under engine-idle power (block 140). Necessarily, the second substantially uniform driving velocity is greater than the first substantially uniform driving velocity.

In a preferred embodiment, downshifting of the semi-automatic or automatic transmission is actuated using bump-depression (a short, shallow depression) of the service brake pedal of the vehicle. In another embodiment, upshifting of the semi-automatic or automatic transmission is actuated using bump-depression of the accelerator pedal of the vehicle.

BRIEF DESCRIPTION OF THE DRAWINGS

The present invention will now be more fully described, by way of example, with reference to the accompanying drawing in which.

DETAILED DESCRIPTION

Figure 1:
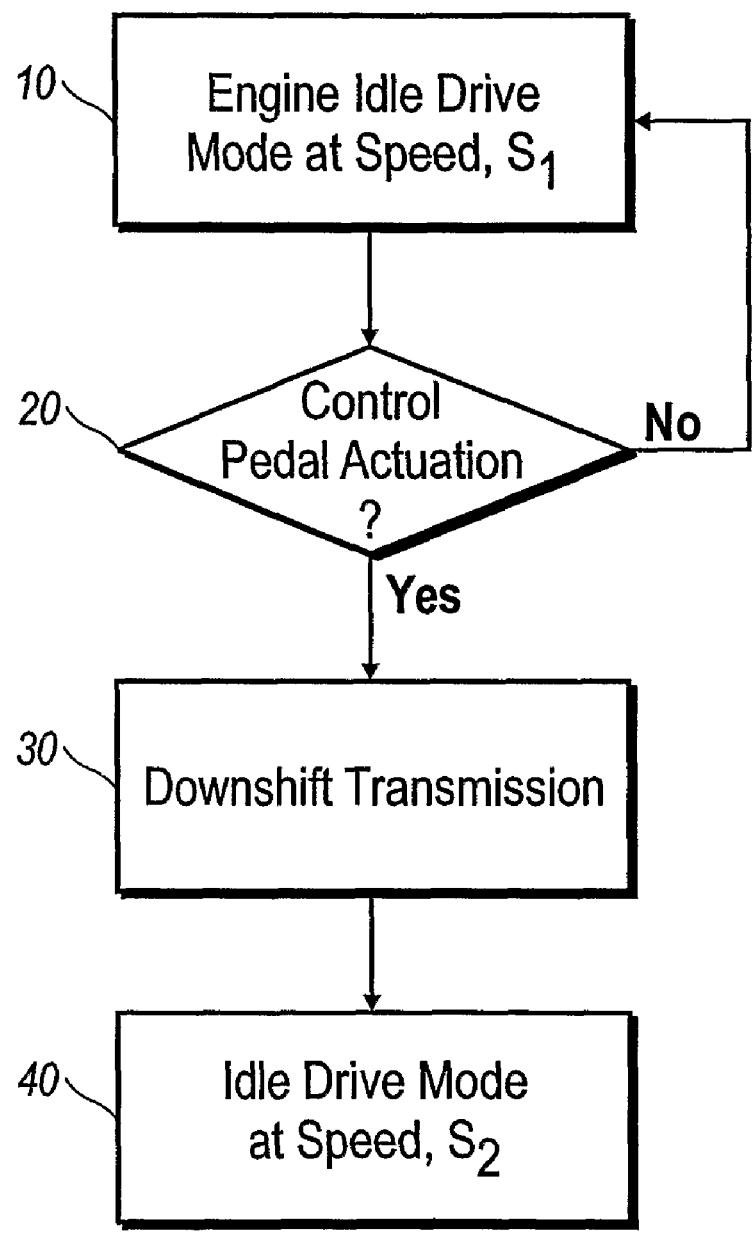
FIG. 1 illustrates a flow diagram of one method of downshifting a semi-automatic or automatic transmission in idle drive mode.
Figure 2:
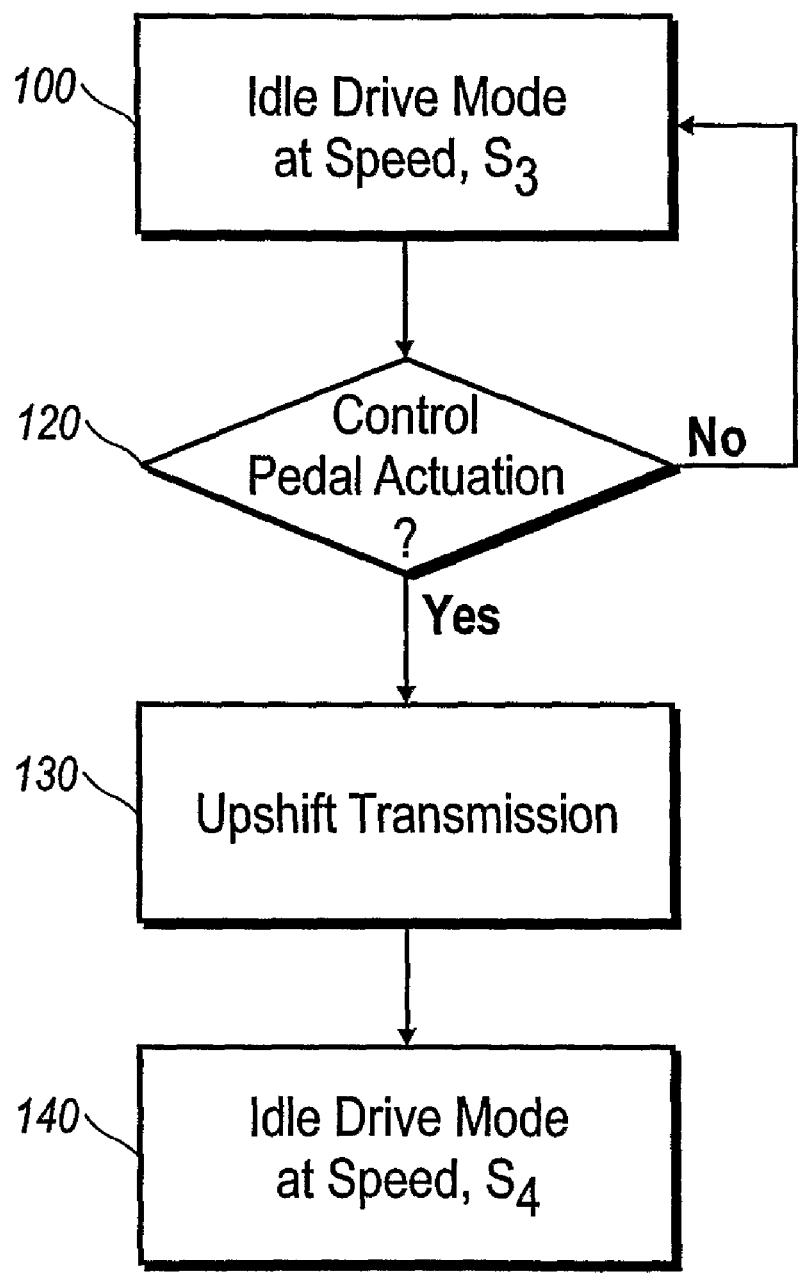
FIG. 2 illustrates a flow diagram of one method of upshifting a semi-automatic or automatic transmission in idle drive mode.
Figure 3:
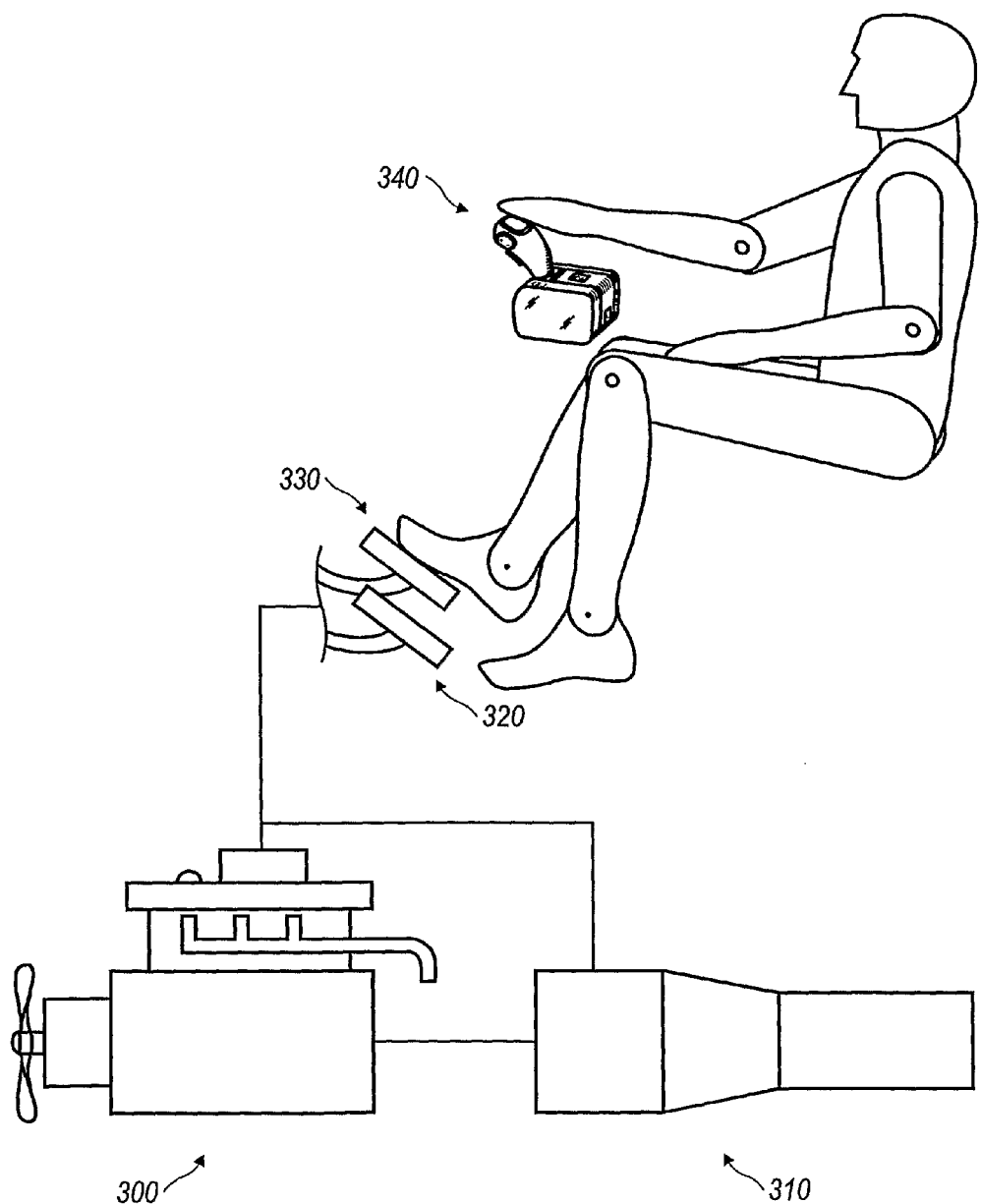
FIG. 3 is a diagram showing the connection of the controls of the brake and accelerator pedal to the engine and transmission.

In such commercial vehicles as heavy trucks and buses, it is common to have computer-controlled subsystems. Among others, those subsystems typically include at least the engine 300, and now transmission 310, to greater or lesser extents as shown in FIG. 3. With the introduction of computer-based control systems for the engine 300 and transmission 310, and the capability for the exchange of information therebetween, it is now possible to automate coordination between the two subsystems for such benefits as fuel economy and acceleration, as well as driver comfort and drivability. Using such computer-based control systems, driver fatigue can be substantially reduced, as well as facilitate a less experienced operator's near expert control of the vehicle. The gear selector 340 enables the driver to select an appropriate gear including selecting a drive mode including but not limited to automatic, manual, and low.

As described hereinabove, driving conditions often exist in which it is desirable that the vehicle be driven at a substantially constant speed, albeit, a relatively slow speed in such conditions as heavy traffic or load yard maneuvering. The need for such slow speed travel can be either forward or reverse, though the need for a greater selection of forward speeds is appreciated.

In a heavy vehicle, such as an overland truck powered by a prime mover 300, a preset idle speed is typically programmed in the engine control strategy. The prime mover preferably is a diesel engine, but can include other devices designed to propel the vehicle such as an electric motor, gasoline engine or hybrid engine combining two or move of the above mentioned devices. As those persons skilled in the art will appreciate regarding a standard torque curve, the engine, at this idle speed will have a maximum torque capability. Variable characteristics of the vehicle bear upon its resistance to travel, as do varying road conditions. While there are several variables within each category (vehicle versus environment) that can influence vehicle travel resistance, the two primary variables are vehicle mass and ground inclination. Both of these characteristics are presently able to be quantified in suitably equipped vehicles, and therefore these variables become known inputs for calculations and gear selections made according to the present invention.

A typical and exemplary situation in which a driver desires to go to an idle engine speed travel condition is approaching and joining a slower speed, high traffic driving pattern. When such a situation is foreseen by a driver, the initial reaction is to remove accelerator input (take their foot off the gas) and began to coast toward the slower traffic pattern or zone. The current invention presumes the detection of such an event (desire to slow the vehicle to a lesser, but constant travel speed), and using certain assessed or measured conditions, such as vehicle mass and road inclination, selecting the highest gear of the transmission that will carry the vehicle at the highest speed utilizing the available torque produced at engine idle speed. In essence, the programmed logic assesses/measures/determines/calculates the vehicle's resistance to roll under presently existing conditions, and matches that resistance against a maximum torque capability of the idling engine using an appropriate and automatically selected gear engagement.

According to the prescribed routine, as the vehicle slows, this prescribed idle travel speed will be eventually reached and the vehicle will continue traveling at that speed.

Oftentimes, however, this maximum idle travel speed is greater than current traffic or site conditions permit and the driver must further slow the vehicle. Because of the frequency at which this occurs, the present invention facilitates the driver by enabling easily actuated, automated downshifts. In an exemplary embodiment, a control pedal is used as an actuator which when depressed, and preferably in a bump-press manner, causes the transmission to downshift one or more gears. Eventually, the vehicle will be traveling at the desired rate of speed under the influence of the idling engine. Control pedals of the vehicle include the accelerator pedal 330, brake pedals which encompass the service brake pedal 320. The service brake pedal 320 is the pedal used to control the brakes of the vehicle used in normal operation, such as slowing to a stop. On some heavy vehicles, there might be multiple service brake pedals 320. Likewise, an upshift can be performed through bump pressing one of the control pedals, preferably the accelerator pedal 330. A driver may desire to perform an upshift in situations where a higher speed is desired, but remain in idle drive mode.

The method of selecting the gear through bump-pressing of the control pedal can be described as occurring in a variety of different ways. One exemplary embodiment for detection of service brake bump-depression is through the use of the brake light sensor. When the service brake pedal is depressed enough to cause the brake light sensor to detect service brake pedal depression, it would be considered a bump-press of the brake. Thus, the brakes of the vehicle would not be required to engage. Alternatively another type of brake pedal depression sensor could be used independent of the brake light sensor, hi another embodiment, a signal is sent to cause a downshift when the brake pedal is depressed, but does not engage the vehicle brakes.

The method of detection of other control pedals including the accelerator pedal 330 is similar to the method described above for detection of depression of the brake pedal. If the pedal is equipped with a sensor as would an accelerator pedal 330, then that sensor could be used for detection of the bump-depression. The pedal might also have a special sensor dedicated to detection of a bump-depression or it might be required if the pedal did not feature a sensor capable of detecting such bump-depression.

The extent to which a pedal needs to be depressed can vary according to the pedal and particular vehicle. In order to prevent retardation of the brake pedal 320, the first part of travel of the brake pedal 320 that does not engage the vehicle brakes is used, hi one exemplary embodiment this range would be less than twenty-five percent of the total travel range of the brake pedal 320. If the vehicle brakes engage sooner, a respective adjustment can be made to the amount of depression as required. The length of the bump-depression is in general very short. In one embodiment, this time in which a bump-depression occurs is less than two seconds.

In another preferred embodiment, a method to cause the transmission to engage in multiple downshifts is presented. The depression of the brake pedal 320 to cause downshifts can be through several different methods and two embodiments are described below. If the pedal 320 is depressed to the point at which it will trigger a downshift command to be issued to the transmission, downshifts will continue to occur until the point in which the transmission has downshifted to the lowest gear. If the brake pedal 320 continues to be depressed, the clutch will be disengaged if it is an automated clutch. Another embodiment is where the brake pedal 320 is bump-pressed and then released and bump-pressed again. For each of these bump-press procedures the transmission will be downshifted. This procedure can be repeated until it reaches the lowest gear. If the clutch is automated then further bump-pressing of the brake pedal 320 will cause the clutch to be disengaged. Thus, the bump-press on the brake 320 effectively works to interrupt the normal automation of the transmission and to provide for driver control of the downshift. This allowed when the vehicle is operating in the idle-driving mode. While the above procedure has been described in relation to the brake pedal 320, as mentioned previously, it applies to any control pedal used in the bump-depression downshifting of the vehicle.

Another preferred embodiment is a method to cause the transmission to engage in multiple upshifts. The depression of the accelerator pedal 330 to cause upshifts can be through several different methods and two embodiments are described below. If the pedal 330 is depressed to the point at which it will trigger an upshift command to be issued to the transmission, upshifts will continue to occur until the point in which the transmission has upshifted to the highest gear at which idle drive is possible. Another embodiment is where the accelerator pedal 330 is bump-pressed and then released and bump-pressed again. For each of these bump-press procedures the transmission will be upshifted. This procedure can be repeated until it reaches the highest gear at which idle drive is possible. Thus, the bump-press on the accelerator pedal 330 effectively works to interrupt the normal automation of the transmission and to provide for driver control of the upshift. This allowed when the vehicle is operating in the idle-driving mode. While the above procedure has been described in relation to the accelerator pedal 330, as mentioned previously, it applies to any control pedal used in the bump-depression upshifting of the vehicle.

A natural and frequent occurrence is that the need for slow travel eventually ceases and the operator desires to accelerate the vehicle back to a higher travel speed. In order to do so, the accelerator is depressed, and depending upon the degree to which the pedal is depressed, normal transmission programming would cause a downshift for increased torque production at a higher engine speed. For certain reasons such as driver comfort and economy, it is desired that such downshifting be prohibited as the vehicle pulls out of the idle speed travel mode and the same gear engagement at which idle travel was taking place be maintained. As the vehicle gains speed, the regular driving transmission control strategies resume operation.

In the manner described hereinabove, computer-based transmission control facilitates easier and more inefficient idle speed driving of a heavy commercial vehicle, as well as gives the operator an easy-to-use procedure for incrementally reducing idle speed travel once established, and accommodating a smooth economical return to normal road speed travel.

What is claimed is:

1. A method for operating an automatic or semi-automatic manual transmission of a heavy vehicle when in idle-driving mode, the method comprising:
    supplying fuel to an engine of the heavy vehicle at a rate that facilitates engine-idle operation;
    engaging the automatic transmission in a gear higher than the starting gear of the transmission and permitting the heavy vehicle to operate at a first substantially uniform driving velocity under engine-idle power;
    downshifting the automatic transmission by depressing a control pedal of the heavy vehicle and then driving the heavy vehicle at a second substantially uniform driving velocity under engine-idle power, wherein the second substantially uniform driving velocity is less than the first substantially uniform driving velocity.

2. The method as recited in claim 1, wherein the control pedal is a brake pedal of the heavy vehicles.

3. The method as recited in claim 1, wherein the control pedal is a service brake pedal of the heavy vehicle.

4. The method as recited in claim 3, wherein the downshifting of the transmission is actuated using bump-depression of the service brake pedal.

5. The method as recited in claim 4, wherein the bump-depression of the service brake pedal is less than one quarter of the total range of motion of the service brake pedal.

6. The method as recited in claim 4, wherein the bump-depression of the service brake pedal is for a period of time less than 2 seconds.

7. The method as recited in claim 4, wherein the bump-depression of the service brake pedal is detected by a brake light sensor.

8. The method as recited in claim 4, wherein the bump-depression of the service brake pedal does not engage vehicle service brakes.

9. The method as recited in claim 4, wherein the bump-depression of the service brake pedal is detected by a dedicated sensor.

10. The method as recited in claim 9, wherein the service brake pedal is maintained at a position that continues to trigger the dedicated sensor.

11. The method as recited in claim 10 wherein the transmission is caused to continually downshift until the transmission reaches a lowest gear.

12. The method as recited in claim 10, wherein the transmission is caused to continually downshift until the transmission reaches a lowest gear and then disengages an automated clutch.

13. A method for operating an automatic or semi-automatic transmission of a heavy vehicle in idle-driving mode, the method comprising: engaging the automated or semi-automated transmission of a heavy vehicle in a gear greater than a starting gear of the transmission, wherein the gear permits the heavy vehicle to travel at substantially uniform velocity under engine-idle power; the method characterized in downshifting the automatic transmission in response to a bump-depression of a service brake pedal.

14. The method as recited in claim 13, wherein the bump-depression of the service brake pedal causes the transmission to downshift one gear.

15. The method as recited in claim 13, wherein multiple bump-depressions of the service brake pedal downshifts the transmission according to occurrences of the bump-depressions.

16. The method as recited in claim 13, wherein the downshifting of the automatic transmission operates the heavy vehicle at an engine-idle speed that is lower than a previous engine-idle speed.

17. A method for operating an automatic or semi-automatic transmission of a heavy vehicle in idle-driving mode, the method comprising: engaging the automated or semi-automated transmission of a heavy vehicle in an idle drive gear, which is greater than a starting gear of the transmission; fueling engine of the heavy vehicle at a rate such that the engine operates at idle speed; the method characterized in downshifting the automatic transmission in response to a bump-depression of a brake pedal.

18. A method for operating an automatic or semi-automatic manual transmission of a heavy vehicle when in idle-driving mode, the method comprising: supplying fuel to an engine of the heavy vehicle at a rate that facilitates engine-idle operation; engaging the automatic transmission in a gear higher than the starting gear of the transmission and permitting the heavy vehicle to operate at a first substantially uniform driving velocity under engine-idle power; the method characterized in upshifting the automatic transmission by depressing a control pedal of the heavy vehicle and then driving the heavy vehicle at a second substantially uniform driving velocity under engine-idle power, wherein the second substantially uniform driving velocity is greater than the first substantially uniform driving velocity.

19. The method as recited in claim 18, wherein the control pedal is an accelerator pedal of the heavy vehicle.

* * * * *